(12) United States Patent
Matsuyama

(10) Patent No.: US 11,628,755 B2
(45) Date of Patent: Apr. 18, 2023

(54) SCREWLESS SHOULDER BEZEL ATTACHMENT FOR A VEHICLE SEAT

(71) Applicant: TOYOTA BOSHOKU KABUSHIKI KAISHA, Aichi-Ken (JP)

(72) Inventor: Fumihiko Matsuyama, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/490,599

(22) Filed: Sep. 30, 2021

(65) Prior Publication Data

US 2022/0105843 A1 Apr. 7, 2022

Related U.S. Application Data

(60) Provisional application No. 63/087,702, filed on Oct. 5, 2020.

(51) Int. Cl.
*B60N 2/58* (2006.01)
*B60N 2/68* (2006.01)
*F16B 21/08* (2006.01)

(52) U.S. Cl.
CPC .......... *B60N 2/686* (2013.01); *B60N 2/5825* (2013.01); *B60N 2/682* (2013.01); *F16B 21/086* (2013.01)

(58) Field of Classification Search
CPC .............................. F16B 21/086; B60N 2/5825
See application file for complete search history.

(56) References Cited

U.S. PATENT DOCUMENTS

| 5,301,396 | A | * | 4/1994 | Benoit | F16B 21/086 411/509 |
|---|---|---|---|---|---|
| 5,328,243 | A | | 7/1994 | Akiyama | |
| 5,415,491 | A | | 5/1995 | Hayakawa et al. | |
| 5,597,206 | A | | 1/1997 | Ainsworth et al. | |
| 5,700,056 | A | | 12/1997 | Bernard | |
| 5,762,401 | A | | 6/1998 | Bernard | |
| 6,139,076 | A | | 10/2000 | Hara et al. | |
| 6,164,723 | A | | 12/2000 | Ganot | |
| 6,312,055 | B1 | | 11/2001 | Uematsu | |
| 7,404,605 | B2 | | 7/2008 | Inoue et al. | |
| 7,410,217 | B2 | | 8/2008 | Inoue et al. | |
| 7,494,187 | B2 | | 2/2009 | Inoue et al. | |
| 7,635,166 | B2 | | 12/2009 | Ishikawa | |
| 7,641,282 | B2 | | 1/2010 | Hinata et al. | |
| 7,828,382 | B2 | | 11/2010 | Ozeki et al. | |

(Continued)

FOREIGN PATENT DOCUMENTS

| DE | 102021111776 A1 | * | 11/2021 | ............... B21J 15/04 |
| FR | 3106169 A1 | * | 7/2021 | ............ F16B 21/086 |

(Continued)

*Primary Examiner* — Timothy J Brindley
(74) *Attorney, Agent, or Firm* — Greenblum & Bernstein, P.L.C.

(57) ABSTRACT

A lever assembly includes a lever housing attached to a seat back of a vehicle seat. The lever assembly includes a bracket attached to the lever housing, and the bracket includes a bracket opening. The lever assembly includes a lever bezel including a bezel opening, the lever bezel is received in the lever housing, and the bezel opening aligns with the bracket opening. The lever assembly includes a lever pivotally mounted to the level bezel and a clip received in the bezel opening and the bracket opening to secure the lever bezel to the lever housing.

9 Claims, 3 Drawing Sheets

(56) References Cited

U.S. PATENT DOCUMENTS

| | | | |
|---|---|---|---|
| 7,909,405 B2* | 3/2011 | Arima | B60N 2/20 |
| | | | 297/378.12 |
| 8,172,327 B2 | 5/2012 | Lindsay | |
| 8,393,682 B2 | 3/2013 | Hosoda et al. | |
| 10,259,350 B2* | 4/2019 | Shirai | B60N 2/90 |
| 10,907,674 B1* | 2/2021 | Engelbreth | F16B 21/071 |
| 2006/0170270 A1 | 8/2006 | Inoue et al. | |
| 2007/0046091 A1 | 3/2007 | Day et al. | |
| 2007/0200410 A1 | 8/2007 | Inoue et al. | |
| 2007/0200411 A1 | 8/2007 | Inoue et al. | |
| 2010/0084520 A1* | 4/2010 | Ohno | B60N 2/72 |
| | | | 248/74.1 |
| 2010/0213747 A1 | 8/2010 | Lindsay | |
| 2010/0237673 A1 | 9/2010 | Lindsay | |
| 2016/0107553 A1* | 4/2016 | Imajo | B60N 2/68 |
| | | | 297/452.18 |
| 2017/0368965 A1* | 12/2017 | Matsushima | B60N 2/682 |
| 2018/0186257 A1* | 7/2018 | Kondrad | B60N 2/832 |
| 2019/0315290 A1* | 10/2019 | Shinohara | F16B 21/086 |
| 2020/0156519 A1* | 5/2020 | Yu | B60N 2/6009 |
| 2021/0221305 A1* | 7/2021 | Buczynski | F16B 5/065 |
| 2021/0245641 A1* | 8/2021 | Hallock | B60N 2/5825 |

FOREIGN PATENT DOCUMENTS

| | | | | |
|---|---|---|---|---|
| WO | WO-2013080160 A1 * | 6/2013 | | A47B 95/00 |
| WO | WO-2014099444 A1 * | 6/2014 | | F16B 19/00 |

* cited by examiner

SCREWLESS SHOULDER BEZEL ATTACHMENT FOR A VEHICLE SEAT

CROSS-REFERENCE TO RELATED APPLICATION

This application claims the benefit of U.S. Provisional Application No. 63/087,702 filed on Oct. 5, 2020.

BACKGROUND

A lever can be actuated to adjust an angle of a seat back of a vehicle seat.

SUMMARY

In one example, a lever assembly includes a lever housing attached to a seat back of a vehicle seat. The lever assembly includes a bracket attached to the lever housing, and the bracket includes a bracket opening. The lever assembly includes a lever bezel including a bezel opening, the lever bezel is received in the lever housing, and the bezel opening aligns with the bracket opening. The lever assembly includes a lever pivotally mounted to the level bezel and a clip received in the bezel opening and the bracket opening to secure the lever bezel to the lever housing.

In another embodiment, the lever housing is located on a top back corner of the seat back of the vehicle seat.

In another embodiment, the lever bezel includes a first side panel, a second side panel substantially parallel to the first side panel, and a bottom panel connecting the first side panel and the second side panel that together define a hollow space that receives the lever.

In another embodiment, the bracket includes a first portion that contacts a first wall of the bottom portion of the lever bezel and a second portion that contacts a second wall of the bottom portion of the lever bezel. The first portion is substantially perpendicular to the second portion, and the second portion of the bracket includes the bracket opening that corresponds to and aligns with the bezel opening in the lever bezel.

In another embodiment, the lever includes a rib located under the bezel opening of the lever bezel, and a bottom of the second portion of the bracket engages the rib to assist in retaining the lever bezel to the bezel housing.

In another embodiment, the bracket opening and the bezel opening each have a first diameter, and the clip includes an enlarged portion having a second diameter greater than the first diameter. When the clip is press fit into the bracket opening and the bezel opening, the enlarged portion of the clip deforms to a diameter less than the first diameter to allow the clip to pass through the bracket opening and the bezel opening. The enlarged portion of the clip expands to the second diameter once the enlarged portion passes through the bracket opening and the bezel opening to secure the lever bezel to the bracket attached to the lever housing.

In another example, a lever assembly includes a lever housing attached to a seat back of a vehicle seat. The lever assembly includes a bracket attached to the lever housing, and the bracket includes a bracket opening, a first portion, and a second portion substantially perpendicular to the first portion. The lever assembly includes a lever bezel including a first side panel, a second side panel substantially parallel to the first side panel, and a bottom panel connecting the first side panel and the second side panel that together define a hollow space. The lever bezel includes a bezel opening, and the lever bezel is received in the lever housing. The bezel opening aligns with the bracket opening, and the housing opening and the bezel opening have a first diameter. The lever assembly includes a rib located under the bezel opening of the lever bezel and a lever pivotally mounted to the level bezel. The lever is a received in the hollow space. The lever assembly includes a clip received in the bezel opening and the bracket opening, and the clip includes an enlarged portion having a second diameter greater than the first diameter. The first portion of the bracket contacts a first wall of the bottom panel of the lever bezel and the second portion of the bracket contacts a second wall of the bottom portion of the lever bezel, and a bottom of the second portion of the bracket engages the rib to assist in retaining the lever bezel to the bezel housing. When the clip is received in the bracket opening and the bezel opening to secure the lever bezel to the lever housing, the enlarged portion of the clip deforms to a diameter less than the first diameter to allow the clip to pass through the bracket opening and the bezel opening. The enlarged portion of the clip expands to the second diameter once the enlarged portion passes through the bracket opening and the bezel opening to secure the lever bezel to the bracket attached to the lever housing.

In another embodiment, the lever housing is located on a top back corner of the seat back of the vehicle seat.

In another example, a method of installing a lever assembly in a seat back of a vehicle seat includes positioning a lever bezel including a lever in a lever housing attached to a seat back of a vehicle seat and aligning a bracket opening of a bracket attached to the lever housing with a bezel opening of the lever bezel. The method incudes inserting a clip into the bracket opening and the bezel opening that are aligned, reducing the diameter of the clip and expanding the diameter of the clip after the clip is inserted into the bracket opening and the bezel opening.

In another embodiment, the method includes reinforcing the bezel opening with a rib.

In another embodiment, the method includes engaging a bottom of the bracket with the rib to assist in retaining the lever bezel to the bezel housing.

DETAILED DESCRIPTION

Figure 1:
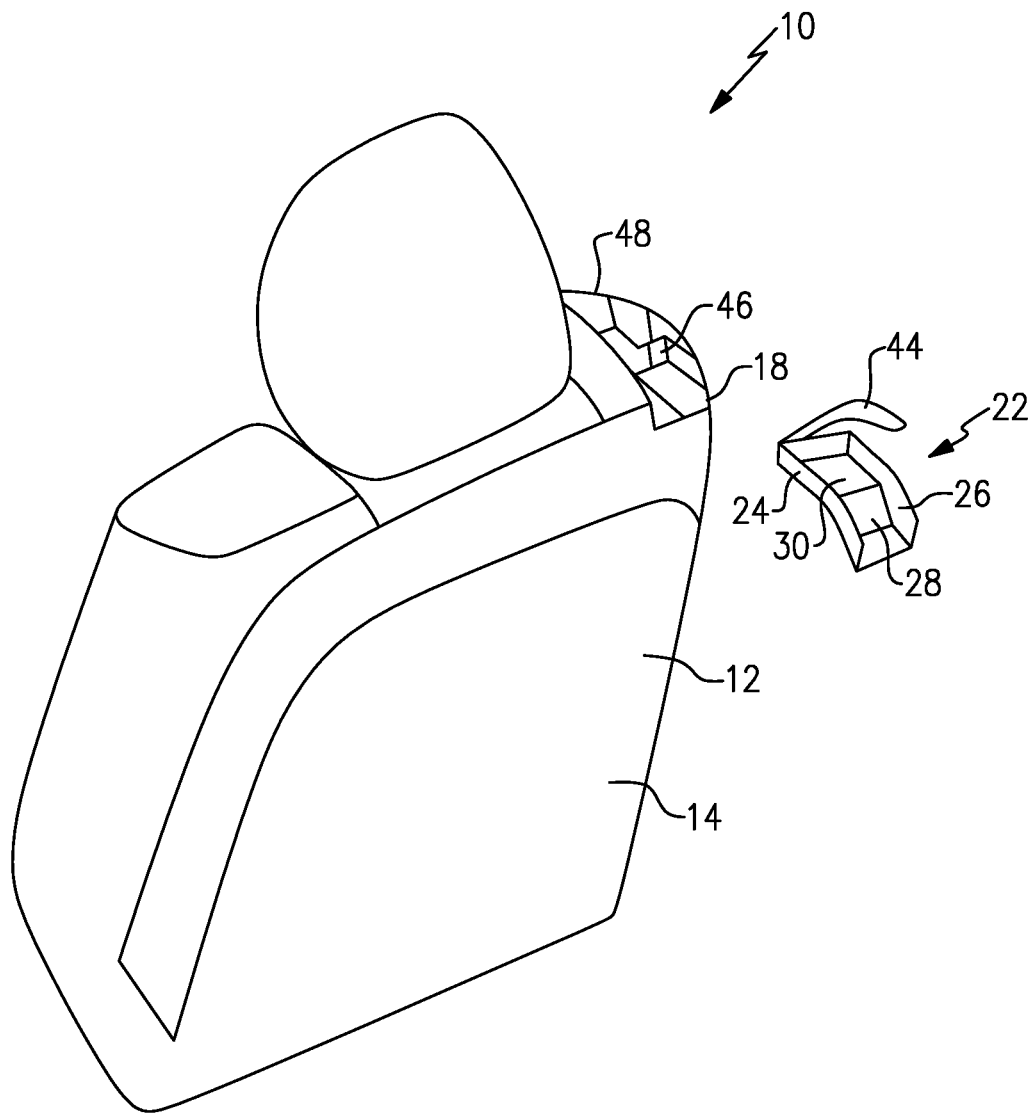
FIG. 1 illustrates a perspective view of a vehicle seat including a lever housing and a lever assembly.
Figure 2:
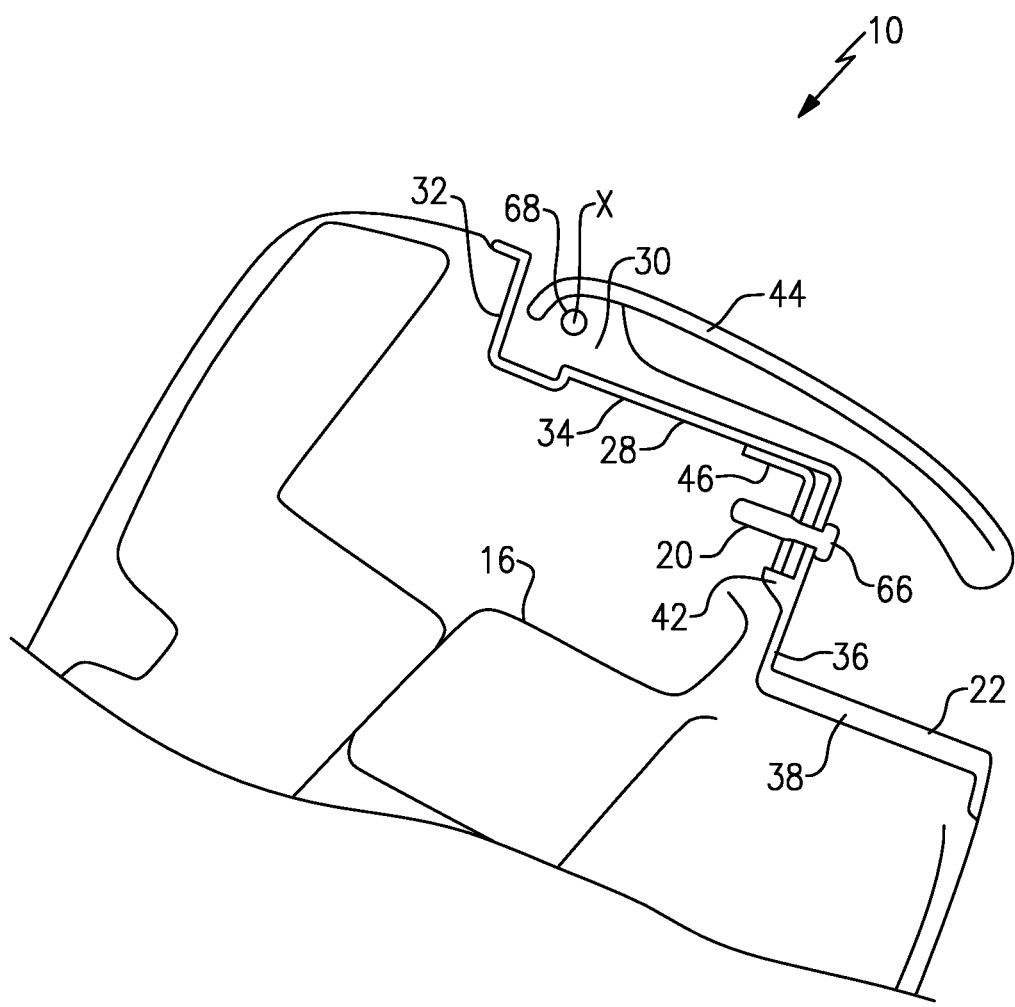
FIG. 2 illustrates a side view of the lever assembly received in the lever housing and attached to the vehicle seat.

FIGS. 1 and 2 illustrate a lever assembly 10. A lever bezel 18 installed on a seat back 12 of a vehicle seat 14. The seat back 12 includes a back frame 16 to provide support to the seat back 12. In one example, the lever bezel 18 is installed in a top back corner 18 of the seat back 12. The lever 44 adjusts an angle of the seat back 12 relative to a seat cushion (not shown) upon which a vehicle occupant sits. A lever 44 is pivotally attached to a lever bezel 22. The lever bezel 22 is attached to a lever housing 48 mounted on the top back corner 18 of the seat back 12.

The lever bezel 22 includes a first side panel 24, a second side panel 26 substantially parallel to the first side panel 24, and a bottom panel 28 connecting the first side panel and the second side panel that together define a hollow space 30. The bottom panel 28 includes a first wall 32 that is substantially parallel to a plane defined by the seat back 12, a second wall 34 that is substantially perpendicular to the first wall 32 and contiguous with the first wall 32, a third wall 36 that is substantially parallel to the plane defined by the seat back 12 that is contiguous with the second wall 34, and a fourth wall 38 that is substantially perpendicular to the third wall 36 and contiguous with the first wall 32.

Figure 3:
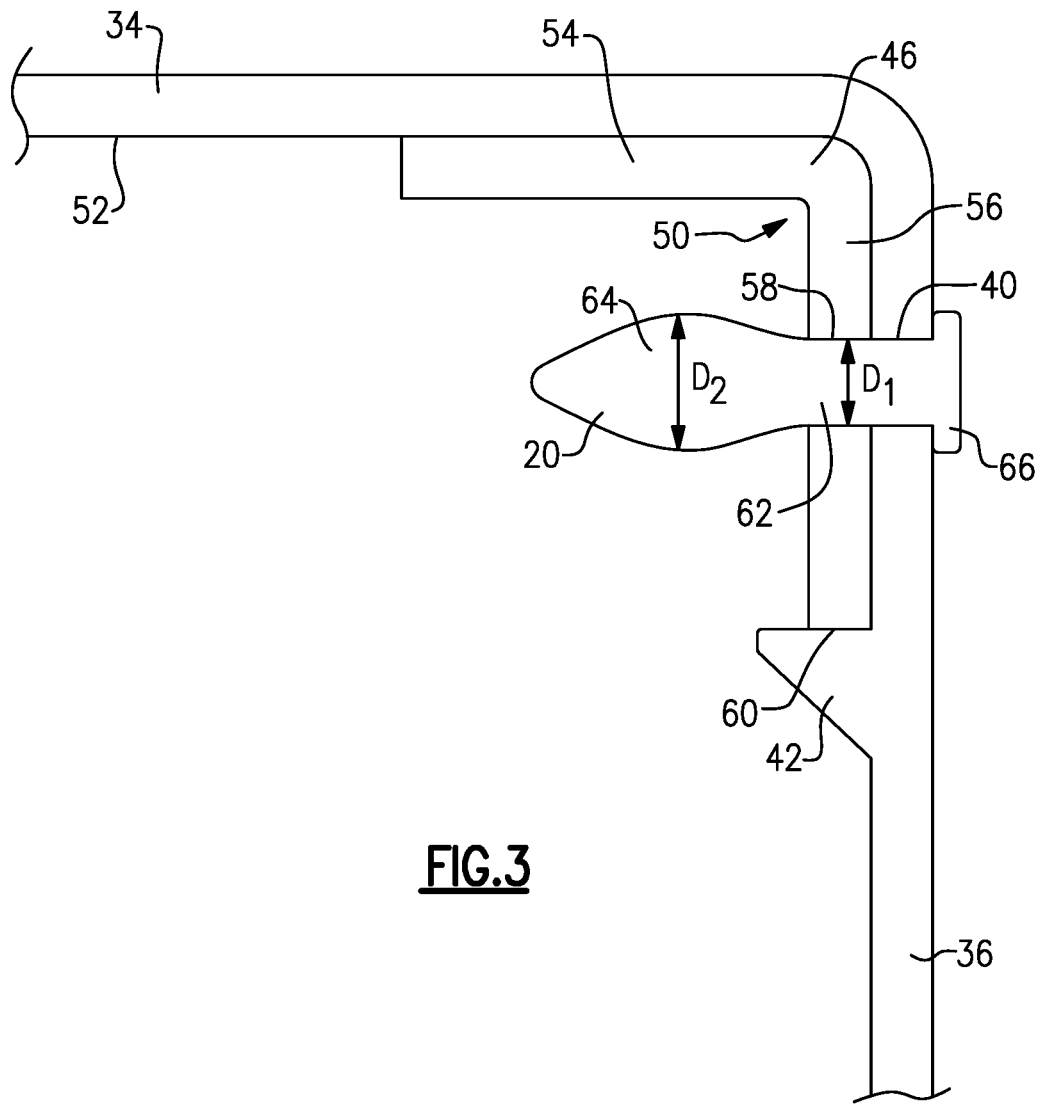
FIG. 3 illustrates a side view of a lever bezel of the lever assembly attached to a bracket with a clip.

As shown in FIG. 3, in one example, the third wall 36 includes an opening 40. In another example, and the third wall 36 includes multiple openings 40. The third wall 36 also includes a rib 42 or ribs under each opening 40 that is molded with the lever bezel 22.

Returning to FIGS. 1 and 2, the lever 44 is received in the hollow space 30 defined by the lever bezel 22. The lever 44 is located above the bottom panel 28. A pivot structure 68 is attached near an intersection of the first wall 32 and the second wall 34, and the lever 44 is attached to the pivot structure 68. The lever 44 can pivot about the pivot structure 68 about an axis X.

A bracket 46 is attached to the lever housing 48 that is attached to the seat back 12 of the vehicle seat 14. The bracket 46 is positioned adjacent the second wall 34 and the third wall 36 of the lever bezel 22 in a space 50 where the second wall 34 and the third wall 36 intersect. The bracket 46 is located adjacent to the underside 52 of the lever bezel 22. That is, the bracket 46 is received on the side of the lever bezel 22 opposite to the location of the lever 44.

The bracket 46 includes a first portion 54 that contacts the second wall 34 and a second portion 56 that contacts the third wall 36. The first portion 54 is substantially perpendicular to the second portion 56. The second portion 56 includes an opening 58 that corresponds with and aligns with the opening 40 in the lever bezel 22. A bottom 60 of the second portion 56 of the bracket 46 engages the rib 42 of the lever bezel 22 to assist in retaining the lever bezel 22 to the lever housing 48. If the lever bezel 22 includes multiple openings 40, the bracket 46 can include multiple openings 58 that each correlate and align with one of the openings 40 of the lever bezel 22.

The lever bezel 22 is positioned in the lever housing 48. The opening 40 of the third wall 36 of the lever bezel 22 is aligned with the opening 58 of the bracket 46. A clip 20 is inserted in the aligned openings 40 and 58 of the third wall 36 of the lever bezel 22 and the bracket 46, respectively, to secure the lever bezel 22 to the lever housing 48. In one example, the clip 20 is resilient. In one example, the clip 20 includes an elongated body 62 having an enlarged portion 64 substantially in the middle of the elongated body 62. The clip 20 also includes a head 66. However, other shapes of the clip 20 are possible. If there are multiple openings 40 and 58, a clip 20 can be received in each of the aligned openings 40 and 58.

In one example, the aligned openings 40 and 58 of the third wall 36 of the lever bezel 22 and the bracket 46, respectively, have a first diameter D1, and the enlarged portion 64 of the clip 20 has a second diameter D2 greater than the first diameter D1. When the clip 20 is press fit into the aligned openings 40 and 58, the enlarged portion 64 of the clip 20 deforms or is biased inwardly to have a diameter less than the second diameter D2 of the aligned openings 40 and 58, allowing the clip 20 to pass through the aligned openings 40 and 58. The head 66 stops the passage of the clip 20 through the aligned openings 40 and 58.

Once the enlarged portion 64 of the clip 20 passes through the aligned openings 40 and 58, the enlarged portion 64 of the elongated body 62 biases outwardly to return to having the second diameter D2, preventing the clip 20 from withdrawing from the aligned openings 40 and 58. The clip 20 secures the lever bezel 22 to the bracket 46 in a single action by pressing the clip 20 through the aligned openings 40 and 58. The clip 20 will not detach during operation of the lever 44, and the rib 42 assists in securing the clip 20 in place. A screw is not required to install the lever bezel 18 to vehicle seat 14. Tools are not required either. This reduces parts, costs, and assembly time.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A lever assembly comprising:
   a lever housing attached to a seat back of a vehicle seat;
   a bracket attached to the lever housing, wherein the bracket includes a first portion, a second portion that is perpendicular to the first portion, and a bracket opening extending through the second portion;
   a lever bezel including a bezel opening, a first side panel, a second side panel parallel to the first side panel, and a bottom panel connecting the first side panel and the second side panel that together define a hollow space, wherein the lever bezel is received in the lever housing, and the bezel opening aligns with the bracket opening;
   a lever pivotally mounted to the level bezel; and
   a clip received in the bezel opening and the bracket opening to secure the lever bezel to the lever housing, wherein
   the first portion of the bracket contacts a first wall of the bottom panel of the lever bezel and the second portion of the bracket contacts a second wall of the bottom panel of the lever bezel.

2. The lever assembly as recited in claim 1 wherein the lever housing is located on a top back corner of the seat back of the vehicle seat.

3. The lever assembly as recited in claim 1 wherein the lever bezel includes a rib located under the bezel opening, and a bottom of the second portion of the bracket engages the rib to retain the lever bezel to the lever housing.

4. The lever assembly as recited in claim 1 wherein the bracket opening and the bezel opening each have a first diameter, the clip includes an enlarged portion having a second diameter greater than the first diameter, and the clip is press fit into the bracket opening and the bezel opening to secure the lever bezel to the bracket attached to the lever housing, the enlarged portion of the clip being deformable to a diameter less than the first diameter to allow the clip to pass through the bracket opening and the bezel opening, and expandable to the second diameter once the enlarged portion passes through the bracket opening and the bezel opening.

5. A lever assembly comprising:
   a lever housing attached to a seat back of a vehicle seat;
   a bracket attached to the lever housing, wherein the bracket includes a bracket opening, a first portion, and a second portion perpendicular to the first portion;
   a lever bezel including a first side panel, a second side panel parallel to the first side panel, and a bottom panel connecting the first side panel and the second side panel that together define a hollow space, and the lever bezel includes a bezel opening, wherein the lever bezel is received in the lever housing, and the bezel opening aligns with the bracket opening, and the bracket opening and the bezel opening have a first diameter;

a rib located under the bezel opening of the lever bezel;

a lever pivotally mounted to the level bezel, wherein the lever is a received in the hollow space; and a clip received in the bezel opening and the bracket opening, wherein the clip includes an enlarged portion having a second diameter greater than the first diameter, wherein the first portion of the bracket contacts a first wall of the bottom panel of the lever bezel and the second portion of the bracket contacts a second wall of the bottom portion of the lever bezel, and a bottom of the second portion of the bracket engages the rib to retain the lever bezel to the lever housing, wherein when the clip is received in the bracket opening and the bezel opening to secure the lever bezel to the lever housing, the enlarged portion of the clip deforms to a diameter less than the first diameter to allow the clip to pass through the bracket opening and the bezel opening, and the enlarged portion of the clip expands to the second diameter once the enlarged portion passes through the bracket opening and the bezel opening to secure the lever bezel to the bracket attached to the lever housing.

6. The lever assembly as recited in claim 5 wherein the lever housing is located on a top back corner of the seat back of the vehicle seat.

7. A method of installing a lever assembly in a seat back of a vehicle seat comprising:

positioning a lever bezel including a lever and a bezel opening in a lever housing attached to the seat back of the vehicle seat, where the lever bezel includes a first side panel, a second side panel parallel to the first side panel, and a bottom panel connecting the first side panel and the second side panel;

aligning a bracket opening of a bracket attached to the lever housing with the bezel opening of the lever bezel, where the bracket includes a first portion and second portion perpendicular to the first portion, and the bracket opening extends through the second portion;

aligning the first portion of the bracket to contact a first wall of the bottom panel of the lever bezel and the second portion of the bracket to contact a second wall of the bottom panel of the lever bezel; and inserting a deformable clip into the aligned bracket opening and bezel opening such that the diameter of the clip is reduced to permit passage through the bracket opening and the bezel opening and expanded after the clip passes through the bracket opening and the bezel opening to secure the lever bezel to the lever housing.

8. The method as recited in claim 7 wherein the lever bezel is provided with a rib that reinforces securement of the lever bezel to the lever housing with the clip.

9. The method as recited in claim 8 further comprising engaging a bottom of the bracket with the rib to retain securement of the lever bezel to the lever housing.

* * * * *